United States Patent
Turaccio et al.

(10) Patent No.: US 6,600,494 B1
(45) Date of Patent: Jul. 29, 2003

(54) COLOR REDUCTION FOR A REMOTE CONTROL SYSTEM

(75) Inventors: PierMario Turaccio, Rome (IT); Salvo Aliffi, Rome (IT); Antonio Perrone, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/569,940

(22) Filed: May 12, 2000

(30) Foreign Application Priority Data

Jul. 26, 1999 (GB) ............................................... 9917455

(51) Int. Cl.⁷ .................................................. G09G 5/02

(52) U.S. Cl. ....................................... 345/605; 382/166

(58) Field of Search ................................ 345/589–591, 345/593–597, 600–605, FOR 130; 382/166

(56) References Cited

FOREIGN PATENT DOCUMENTS

| EP | 0556654 | 2/1993 | ............ H04N/1/46 |
|----|---------|--------|----------------------|
| GB | 2223149 | 6/1989 | |

*Primary Examiner*—Matthew C. Bella
*Assistant Examiner*—T. F. Cunningham
(74) *Attorney, Agent, or Firm*—Douglas W. Cameron; Anne V. Dougherty

(57) ABSTRACT

A method and a system for a fast and reliable color reduction from multiple bit color representations to 4 bit color representations. The method for color reduction in a computer system having a three color model for color representation of a pixel, each color being represented by a multiple bit pattern, reduces the color to a four bit value by analysing the first bit of each of said three multiple bit patterns to determine tone; assigning a value to the first bit of said four bit value, based on said determined tone; and assigning the remaining three bits of said four bit value by utilising one pre-determined bit from each of said three multiple bit patterns.

16 Claims, 1 Drawing Sheet

COLOR REDUCTION FOR A REMOTE CONTROL SYSTEM

TECHNICAL FIELD

The present invention relates to remote control systems and particularly to a system and method for reducing color related information.

BACKGROUND OF THE INVENTION

Remote control programs are a special category of communication applications. They go beyond just connecting a computer with another computer to actually taking control of it. By connecting through phone lines and modems or through LAN/WAN connections, these programs can put all the resources of one data processing system (e.g. a personal computer or a workstation), usually called the target, under the complete control of another data processing system (e.g. a personal computer or a workstation, connected with a LAN/WAN), usually called the controller. The controller screen duplicates the target one. The keyboard of the controller can enter characters directly on the target data processing system;

the mouse of the controller can move the mouse pointer on the target screen. The controller screen constantly receives data from the target data processing system screen. Likewise, the keyboard of the controller sends data to the target data processing system every time a key is hit. For all practical purposes, the controller user may as well be sitting in front of the target data processing system.

This kind of remote control software can be useful in a number of circumstances. Just as an example an office personal computer system can be controlled and operated from home personal computers. If the office PC is left connected to a modem, the control can be taken from the home PC and all the resources of the target PC can be controlled and used remotely. A more specific use is to dial in (via modem) to a network-connected PC at the office, log in, and run network applications or update shared files on the network.

The bottleneck caused by modems can have a significant effect on the speed of remote control operations. To boost performances, remote control programs try to reduce and minimize the amount of data that needs to be transmitted over the communication lines (LAN/WAN or telephone cables). The refresh of the video image on the display screen of the target PC, which should be duplicated on the controller PC, constitutes the main factor in the transmission speed, due to the large quantity of information which has to be transferred. In the past, remote control programs worked by sending and refreshing the entire image of the target PC screen to the remote PC every fraction of a second. The constant rate at which the screen images were sent to the controller PC was called the screen refresh rate. The controller PC screen accurately reflected the target PC screen as changes at the target PC would be included in the next screen refresh. This approach was, of course, not very satisfactory in terms of speed, because of the enormous amount of data to be transmitted at each refresh.

Often, a change of the image is limited to a small section of the screen (e.g. moving the mouse pointer, pulling down a menu, highlighting an object) and only the changed data needs to be refreshed. The controller system can use the screen data previously received and just refresh the modified part of the screen. By cutting out redundant screen refresh data, a remote control program can improve the response time. Cache memories speed the performance of hard drives and memory chips, and can also be useful for remote control programs. The idea behind a cache is to keep recently used data in a temporary storage area that is quickly accessible. If the data are soon needed again, it is much quicker to access them from a fast-access temporary storage area than to retrieve from the original source. According to this technique, elements of a recently displayed screen are saved as a cache in extended memory. The entire page redraws from the controller PC screen cache, eliminating the need to transfer large amounts of information over the modem from the target to the controller PC. Screen elements that are often redrawn from a screen cache include bit maps, text and fonts.

An example of a prior art remote control system is Tivoli Remote Control V3.6.1 produced by International Business Machines Corporation.

In the transmission of a bit-map image, one of the heaviest information to send is the color of each pixel. In the well known RGB format, the color of each pixel is represented by three octets (i.e. three bytes having 8 bits each), one for the Red, one for the Green and one for the Blue. The maximum possible number of different colors is 16,777,216, i.e. $2^{24}$. This representation with all the possible colors is called "true color".

In remote control systems (as in many other circumstances) this detailed color representation is not always needed and the transmission of all this information frequently constitutes an unwanted burden. Usually for the scope of the controller system, a poorer color image would be enough. For this reason, many remote control systems use color reduction algorithms to reduce the color representation from 24 (or 16) bits to 8 bits or even 4 bits. An example of a function implementing these algorithms is the Microsoft Windows API called GetDIBits which is implemented on all the Microsoft Windows versions produced by Microsoft Corporation. A drawback of prior art color reduction functions is that they require a relatively long computation time to perform this color reduction, mostly due to the effort of creating a reduced image as close as possible to the original one. In remote control system, where these operations must be performed very often at a very high speed, the color reduction delay is unacceptable.

SUMMARY OF THE INVENTION

Accordingly the present invention provides a method for colour reduction in a computer system having a three colour model for colour representation of a pixel, each colour being represented by a multiple bit pattern, said method reducing the colour to a four bit value by the steps of analysing the first bit of each of said three multiple bit patterns to determine tone; assigning a value to the first bit of said four bit value, based on said determined tone; and assigning the remaining three bits of said four bit value by utilising one pre-determined bit from each of said three multiple bit patterns.

In a preferred embodiment of the present invention the first bit has the value 1 if the tone of the colour is determined to be bright and the value 0 if the tone of the colour is determined to be dark. The bright tone occurs when at least one of said first bits of each of the three multiple bit patterns has the value 1, and the dark tone occurs when all of said first bits of each of the three multiple bit patterns has the value 0. For the bright tone, the values of the first bit of each of the three multiple bit patterns are assigned to the remaining three bits of the four bit value, whilst for the dark tone, the values of the second bit of each of the three multiple bit patterns are assigned to the remaining three bits of the four bit value.

In a preferred embodiment of the present invention, the three colour model is the RGB colour model. The values of the pre-determined bits from each of the three multiple bit patterns are then assigned to the remaining three bits of the four bit value in the order of the red bit pattern, green bit pattern and blue bit pattern. Typically each colour multiple bit pattern comprises an octet (ie 8 bits). bit patterns are then assigned to the remaining three bits of the four bit value in the order of the red bit pattern, green bit pattern and blue bit pattern. Typically each colour bit pattern comprises an octet (ie 8 bits).

In an alternative embodiment of the present invention, the value of each bit can be represented as a mirror image of that described above. For example, the brightest tone may be represented by an initial bit of 0 rather than 1. Note that one advantage of using the preferred scheme of the present invention is that the standard palette table for the VGA graphical system, comprising 16 colour entries, can then be used directly to determine the colour represented by the four bit value.

The present invention finds particular utility in a remote control environment comprising two or more data processing systems in communication with each other. A first data processing system can remotely control a second data processing system and colour reduction is performed prior to transmitting colour image data from the second data processing system to the first data processing system. This process then saves significant bandwidth in communications between the second and first systems.

The present invention further provides a system having a three colour model for colour representation of a pixel, each colour being represented by a multiple bit pattern, said system including means for reducing the colour from the three multiple bit pattern representation to a four bit value comprising means for analysing the first bit of each of said three multiple bit patterns to determine tone; means for assigning a value to the first bit of said four bit value, based on said determined tone; and means for assigning the remaining three bits of said four bit value by utilising one pre-determined bit from each of said three multiple bit patterns.

BRIEF DESCRIPTION OF THE DRAWINGS

Various embodiments of the invention will now be described in detail by way of examples, with reference to accompanying figures, where:

FIG. 1 illustrates an example of a typical Local Area Network (LAN) where a remote control system can be implemented. It comprises a LAN server 101 which acts as a communication bridge between two or more data processing systems. In other connection systems the function of the server would be performed, for example, by a bridge, a modem, a cable or, in general, any device that, interposed between two or more data processing system, makes them connected.

DETAILED DESCRIPTION OF THE PREFERRED EMBODIMENT

Figure 1:
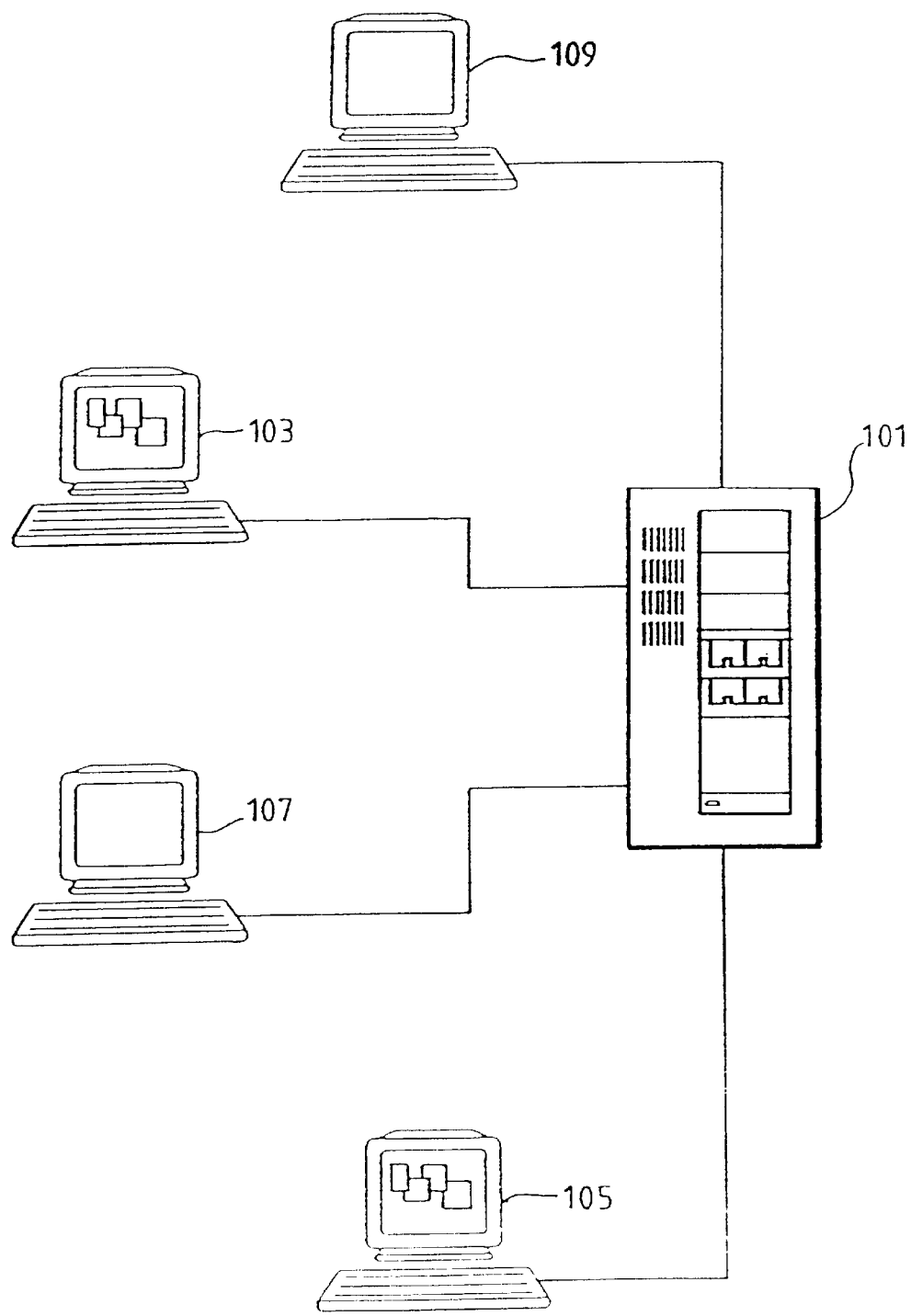
FIG. 1 shows schematically the network and the personal computers which may be utilized to implement the method and system of the present invention.

The data processing system 105 is the controller and can alternatively take the control of one of the other data processing system 103, 107 and 109.

Data processing systems 103, 105, 107 and 109 can be personal computers or workstations available on the market. They preferably include a display unit and a keyboard, coupled in a manner well known in the art. Additionally, the data processing systems include a processor system unit which may serve to mount a fixed disk drive and a diskette drive in addition to the main processor and memory. Further, in order to facilitate the utilization of a graphical user interface, the data processing systems preferably include a graphic pointing device, such as a mouse, which may be utilized to manipulate the position of a pointer within a visual display on the screen.

Those skilled in the art will appreciate that data processing systems described above may be implemented utilizing any state-of-the-art personal computer, such as the PS/2 Personal Computer manufactured by International Business Machines Corporation. (PS/2 is a trademark of International Business Machines Corporation).

Data processing systems are usually provided with a graphical user interface (GUI) to allow a user to control the data processing system and to present the results of user actions on the system display. In a graphical user interface, applications and data are generally presented as objects depicted on a user interface. A user is then provided with a graphical, intuitive interface to a complex data processing system which permits graphic selection of depicted objects and manipulation of applications corresponding to those objects.

There are a number of different graphical user interface environments commercially available which utilize the arrangement described above. These environments include the System 7 operating system developed by Apple Computer, Inc. (System 7 is a trademark of Apple Computer, Inc.), the Windows graphical user interface developed by the Microsoft Corporation (Windows is a trademark of Microsoft Corporation) and the OS/2 Presentation Manager developed by International Business Machines Corporation (OS/2 and Presentation Manager are trademarks of International Business Machines Corporation).

The window environment is generally part of the operating system software that includes a collection of utility programs for controlling the operation of the computer system 100.

In the example shown in FIG. 1 system 103 is defined as the target system and all the resources of system 103 can be used and activated by the controller system. For performing such control, system 105 must be able to represent on its display an exact copy of the target display 103.

As mentioned above, one of the heaviest information that must be transmitted over the network is the color of each pixel of the original image. Most of time the level of precision requested in color rendering on the controller display is not very high and sending of complete color information would waste transmission time. According to the RGB format, the color of each pixel is represented by three octets (i.e. three bytes having 8 bits each), one for the Red, one for the Green and one for the Blue. A subset of 256 of the possible 16,777,216 colors is more than enough for most of the remote control applications. Sometimes, even 16 colors would be an acceptable compromise.

According to a preferred embodiment of the present invention, only the first bits of the three original octets R, G and B are considered, i.e. the first three for the Red, the first three for the Green and the first two for the Blue. These 8 bits will be the reduced color associated with the pixel and they will be the entry into a 256 colors palette which was previously agreed between the target and the controller system (or more in general between the computer sending the original image and the computer receiving it). Those skilled in the art will appreciate that this very simple color reduction method is very fast and inexpensive both in terms of computation and transmission.

Even in this 256 subset color palette, each color is represented by three octets, one for Red, one for Green and one for Blue. The remaining bits of each octet, i.e. the bits which have been "cut" in the reduction operation, will have to be filled in order to correctly represent the color. According to a preferred embodiment, this is done by inserting the average value. This corresponds to a zero followed by ones or to a one followed by zeroes. In the example above it will be 01111 (or 1000) for Red and Green and 011111 (or 100000) for Blue.

EXAMPLE 1

Let's suppose we have a bit-map pixel with a 24 bits representation (true color) and we want to reduce it to a 8 bits format:

| R | G | B |
|---|---|---|
| 101xxxxx | 011xxxxx | 11xxxxxx | we choose the first three bits for Red and Green and the first two for Blue and we obtain a binary number 10101111 which corresponds to the 176th entry (175 decimal) in a palette of 256 colors.

This palette has been previously built in the following way:

for each one of the 256 entries we take the corresponding binary number (e.g. 10101111=175 decimal) and we assign the first three bits to the first three bits of Red, the second three bits to the first three of Green and the last two bits to the first two of Blue, filling the remaining bits with the average value:

| R | G | B |
|---|---|---|
| 101+01111 | 011+01111 | 11+011111 |

Where '+' means concatenation.

Of course the receiving machine (i.e. the controller computer in a remote control system) needs to know in advance the 256 palette in order to translate the 8 digit pixel into the 24 digit one.

Those skilled in the art will appreciate that a very similar algorithm can be used to transform a 16 bits pixel into a 8 bits pixel.

The results obtained with the above described method are excellent, considering the simplicity and the speed of the reduction process. Other more complicated methods can give better results, but the expense in computation time would not be justified, particularly in a remote control system environment, where the speed of elaboration and transmission is a more important factor than the quality of the picture color.

According to a second aspect of the present invention we provide a color reduction method from 24 bits (or 16 bits) to 4 bits. This is a very abrupt reduction, because we have to map 16,777,216 colors into 16 colors only. However, as explained above, remote control systems often need only a very rough representation of the original colors. The final 16 colors palette can be addressed by the 16 possible values of a 4 binary digit number, ranging form 0000 (black) to 1111 (white).

According to an embodiment of the present invention, a preliminary analysis is made on the three RGB octets. The first bit of each octet is the heaviest and more important one. If all of three first bits of Red, Green and Blue are 0, we can deduct that the color represented is a dark color, because in the RGB device independent format the range of color goes from 0000000 (darkest tone) to 11111111 (brightest tone): the medium tone will be 01111111 and it will be the limit between dark and bright tones.

According to an embodiment of the present invention only the first two bits of each basic color octet (R, G and B) are considered. If the first bit for all the three basic color is 0, the color is considered dark and on the final 16 color palette it will be addressed by a 4 digit code having 0 as the first value. Otherwise the first digit will be 1, i.e. the resulting color will be one of the 8 brightest colors on the 16 colors palette. The remaining three bits of the final pixel are filled with the second bits of the three original octet in the case of dark color (i.e. all the first bits being 0); otherwise with the first bits of the three octet.

EXAMPLE 2

Let's suppose we have the following values for Red, Green and Blue octet:

| R | G | B |
|---|---|---|
| 10xxxxxx | 01xxxxxx | 11xxxxxx |

Since there is at least one of the first bits of Red, Green and Blue which is 1, the color is bright, so we assign 1 to the first bit of the final 4 digits number. The remaining three digits will be 1, 0 and 1 (i.e. the first bits of the original R, G and B).

The resulting 4 digit number will be 1101 (=13 decimal), i.e. one of the 8 brightest colors in the 16 color palette.

EXAMPLE 3

Let's suppose we have the following values for Red, Green and Blue octet:

| R | G | B |
|---|---|---|
| 00xxxxxx | 01xxxxxx | 01xxxxxx |

Since all the first bits of Red, Green and Blue are 0, the color is dark, so we assign 0 to the first bit of the final 4 digit number. The remaining three digits will be 0, 1 and 1 (i.e. the second bits of the original R, G and B).

The resulting 4 digit number will be 0011 (=3 decimal), i.e. one of the 8 darkest colors in the 16 color palette.

The above described method is extremely simple, but the results obtained are quite accurate. In a preferred embodiment of the present invention it has been used as the 16 color palette the standard color palette for the VGA Graphical subsystem.

We claim:

1. A method for colour reduction in a computer system having a three colour model for colour representation of a pixel, each colour being represented by a multiple bit pattern, said method reducing the colour to a four bit value by the steps of:

analysing the first bit of each of said three multiple bit patterns to determine tone;

assigning a value to the first bit of said four bit value, based on said determined tone; and assigning the remaining three bits of said four bit value by utilising one pre-determined bit from each of said three multiple bit patterns.

2. A method as claimed in claim 1, in which the first bit has the value 1 if the tone of the colour is determined to be bright and the value 0 if the tone of the colour is determined to be dark.

3. A method as claimed in claim 2 in which said bright tone occurs when at least one of said first bits of each of said three multiple bit patterns has the value 1.

4. A method as claimed in claim 3 in which said dark tone occurs when all of said first bits of each of said three multiple bit patterns has the value 0.

5. A method as claimed in claim 4, in which for said bright tone the values of said first bit of each of said three multiple bit patterns are assigned to said remaining three bits of said four bit value.

6. A method as claimed in claim 5, in which for said dark tone the values of the second bit of each of said three multiple bit patterns are assigned to said remaining three bits of said four bit value.

7. A method as claimed in claim 6 in which said three colour model is the RGB colour model.

8. A method as claimed in claim 7 in which the values of the pre-determined bits from each of said three multiple bit patterns are assigned to said remaining three bits of said four bit value in the order of the red bit pattern, green bit pattern and blue bit pattern.

9. A method as claimed in claim 8 in which the standard palette table for the VGA graphical system, comprising 16 colour entries, is used to determine the colour represented by said four bit value.

10. A method as claimed in claim 9, in which said four bit value is converted into a corresponding decimal value.

11. A method as claimed in claim 10, in which said decimal value is used to determine the corresponding colour entry in said standard palette table.

12. A method as claimed in claim 11 in which each colour bit pattern comprises an octet.

13. A method as claimed in claim 1 in which said computer system is used in a remote control environment comprising two or more data processing systems in communication with each other in which a first data processing system can remotely control a second data processing system, wherein said colour reduction is performed prior to transmitting colour image data from the second data processing system to the first data processing system.

14. A method as claimed in claim 13 in which said first data processing system includes said standard palette table.

15. A computer system having a three colour model for colour representation of a pixel, each colour being represented by a multiple bit pattern, said system including means for reducing the colour from the three multiple bit pattern representation to a four bit value comprising:

means for analysing the first bit of each of said three multiple bit patterns to determine tone;

means for assigning a value to the first bit of said four bit value, based on said determined tone; and means for assigning the remaining three bits of said four bit value by utilising one pre-determined bit from each of said three multiple bit patterns.

16. A program storage device readable by machine tangibly embodying a program of instructions for said machine to execute a method for for colour reduction in a computer system having a three colour model for colour representation of a pixel, each colour being represented by a multiple bit pattern, said method reducing the colour to a four bit value by the steps of:

analysing the first bit of each of said three multiple bit patterns to determine tone;

assigning a value to the first bit of said four bit value, based on said determined tone; and assigning the remaining three bits of said four bit value by utilising one pre-determined bit from each of said three multiple bit patterns.

* * * * *